US011836776B2

(12) United States Patent
Hewavitharana et al.

(10) Patent No.: US 11,836,776 B2
(45) Date of Patent: *Dec. 5, 2023

(54) DETECTING CROSS-LINGUAL COMPARABLE LISTINGS

(71) Applicant: eBay Inc., San Jose, CA (US)

(72) Inventors: Sanjika Hewavitharana, Milpitas, CA (US); Evgeny Matusov, Aachen (DE); Robinson Piramuthu, Oakland, CA (US); Hassan Sawaf, Los Gatos, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,574

(22) Filed: Nov. 15, 2022

(65) Prior Publication Data
US 2023/0079147 A1    Mar. 16, 2023

Related U.S. Application Data

(63) Continuation of application No. 16/405,082, filed on May 7, 2019, now Pat. No. 11,526,919, which is a
(Continued)

(51) Int. Cl.
*G06N 3/02*    (2006.01)
*G06F 16/906*    (2019.01)
(Continued)

(52) U.S. Cl.
CPC ......... *G06Q 30/0623* (2013.01); *G06F 16/50* (2019.01); *G06F 40/58* (2020.01); *G06N 20/00* (2019.01); *G06Q 30/0601* (2013.01)

(58) Field of Classification Search
USPC ............... 382/100–101, 155–165, 187–224; 704/1–10; 705/14.4–27.2; 706/6–62,
(Continued)

(56) References Cited

U.S. PATENT DOCUMENTS 7,805,337 B1    9/2010 Ogg
8,086,643 B1    12/2011 Tenorio
(Continued)

FOREIGN PATENT DOCUMENTS

JP    2005-250536 A    9/2005
JP    2014-142975 A    8/2014
WO    2016/040672 A1    3/2016

OTHER PUBLICATIONS

Aanen et al; "SCHEMA—An Algorithm for Automated Product Taxonomy Mapping in E-commerce"; 2012; Springer-Verlag; E. Simperl et al. (Eds.): ESWC 2012, LNCS 7295, pp. 300-314 (Year: 2012), 15 pages.
(Continued)

*Primary Examiner* — Marcellus J Augustin
(74) *Attorney, Agent, or Firm* — SCHWEGMAN LUNDBERG & WOESSNER, P.A.

(57) ABSTRACT

In various example embodiments, a system and method for a Listing Engine that translates a first listing from a first language to a second language. The first listing includes an image(s) of a first item. The Listing Engine provides as input to an encoded neural network model a portion(s) of a translated first listing and a portions(s) of a second listing in the second language. The second listing includes an image(s) of a second item. The Listing Engine receives from the encoded neural network model a first feature vector for the translated first listing and a second feature vector for the second listing. The first and the second feature vectors both include at least one type of image signature feature and at least one type of listing text-based feature. Based on a similarity score of the first and second feature vectors at least meeting a similarity score threshold, the Listing Engine generates a pairing of the first listing in the first language
(Continued)

with the second listing in the second language for inclusion in training data of a machine translation system.

20 Claims, 7 Drawing Sheets

Related U.S. Application Data continuation of application No. 15/264,873, filed on Sep. 14, 2016, now Pat. No. 10,319,019.

(51) Int. Cl.

| | |
|---|---|
| *G06F 40/20* | (2020.01) |
| *G06F 40/205* | (2020.01) |
| *G06F 40/237* | (2020.01) |
| *G06F 40/263* | (2020.01) |
| *G06F 40/284* | (2020.01) |
| *G06F 40/40* | (2020.01) |
| *G06F 40/44* | (2020.01) |
| *G06Q 30/0601* | (2023.01) |
| *G06F 40/58* | (2020.01) |
| *G06N 20/00* | (2019.01) |
| *G06F 16/50* | (2019.01) |

(58) Field of Classification Search
USPC .............................................. 706/900–903
See application file for complete search history.

(56) References Cited

U.S. PATENT DOCUMENTS

| | | | |
|---|---|---|---|
| 8,275,726 | B2 | 9/2012 | Tsaparas et al. |
| 8,280,856 | B2 | 10/2012 | Rohan et al. |
| 8,452,773 | B1 | 5/2013 | Young |
| 8,639,596 | B2 * | 1/2014 | Chew .................... G06Q 40/00 |
| | | | 705/30 |
| 8,670,609 | B2 | 3/2014 | Imai et al. |
| 8,825,467 | B1 * | 9/2014 | Chen .................... G06F 40/51 |
| | | | 704/4 |
| 9,177,059 | B2 | 11/2015 | Musgrove et al. |
| 9,262,784 | B2 | 2/2016 | Shi |
| 9,721,291 | B1 | 8/2017 | Kennis |
| 10,217,147 | B2 | 2/2019 | Shivaswamy et al. |
| 10,319,019 | B2 | 6/2019 | Hewavitharana et al. |
| 2003/0028469 | A1 | 2/2003 | Bergman et al. |
| 2004/0143600 | A1 | 7/2004 | Musgrove et al. |
| 2004/0254950 | A1 | 12/2004 | Musgrove et al. |
| 2005/0159974 | A1 | 7/2005 | Moss et al. |
| 2007/0073591 | A1 | 3/2007 | Perry et al. |
| 2008/0082426 | A1 | 4/2008 | Gokturk et al. |
| 2008/0140591 | A1 | 6/2008 | Agarwal et al. |
| 2008/0162111 | A1 | 7/2008 | Bangalore et al. |
| 2008/0189257 | A1 | 8/2008 | Wiseman et al. |
| 2008/0255967 | A1 | 10/2008 | Shi |
| 2009/0043767 | A1 | 2/2009 | Joshi et al. |
| 2009/0319257 | A1 | 12/2009 | Blume et al. |
| 2010/0023315 | A1 | 1/2010 | Quirk |
| 2011/0238455 | A1 | 9/2011 | Duong et al. |
| 2011/0320454 | A1 | 12/2011 | Hill et al. |
| 2013/0311474 | A1 | 11/2013 | Emmanuel |
| 2013/0311475 | A1 | 11/2013 | Emanuel |
| 2013/0315477 | A1 | 11/2013 | Murray et al. |
| 2014/0201126 | A1 | 7/2014 | Zadeh et al. |
| 2015/0046300 | A1 | 2/2015 | Menipaz et al. |
| 2015/0134319 | A1 * | 5/2015 | Chelly ................ G06F 16/3344 |
| | | | 704/2 |
| 2016/0063590 | A1 | 3/2016 | Subramanya et al. |
| 2016/0078507 | A1 | 3/2016 | Shivaswamy et al. |
| 2017/0169014 | A1 | 6/2017 | Sotelo et al. |
| 2018/0075508 | A1 | 3/2018 | Hewavitharana et al. |
| 2018/0253421 | A1 * | 9/2018 | Ruvini ............... G06Q 30/0601 |
| 2019/0362401 | A1 | 11/2019 | Hewavitharana et al. |

OTHER PUBLICATIONS

Final Office Action received for U.S. Appl. No. 14/517,505, dated Nov. 16, 2017, 48 pages.
Final Office Action received for U.S. Appl. No. 14/517,505, dated Sep. 1, 2017, 47 pages.
International Search Report and Written Opinion of the International Searching Authority, issued in connection with Int'l Appl. No. PCT/US2015/049478, dated Dec. 17, 2015 (7 pages).
Non-Final Office Action received for U.S. Appl. No. 14/517,505, dated Apr. 30, 2018, 49 pages.
Non-Final Office Action received for U.S. Appl. No. 14/517,505, dated Feb. 23, 2017, 26 pages.
Non-Final Office Action received for U.S. Appl. No. 16/405,082, dated Apr. 21, 2022, 15 pages.
Notice of Allowability received for U.S. Appl. No. 15/264,873, dated Jan. 30, 2019, 9 pages.
Notice of Allowance received for U.S. Appl. No. 14/517,505, dated Oct. 3, 2018, 9 pages.
Notice of Allowance received for U.S. Appl. No. 15/264,873, dated Dec. 7, 2018, 10 pages.
Notice of Allowance received for U.S. Appl. No. 16/405,082, dated Aug. 8, 2022, 11 pages.
ProductMatch, Retrieved from the Internet URL: <https://dataladder.com/products/productmatch/>, Feb. 25, 2016, 3 pages.
U.S. Appl. No. 15/264,873, filed Sep. 14, 2016, Issued, U.S. Pat. No. 10,319,019.
U.S. Appl. No. 16/405,082, filed May 7, 2019, Issued, U.S. Pat. No. 11,526,919.
U.S. Appl. No. 62/049,590, filed Sep. 12, 2014, Expired.
U.S. Appl. No. 14/517,505, filed Oct. 17, 2014, Issued, U.S. Pat. No. 10,217,147.
PCT/US2015/049478, Sep. 10, 2015, Published, WO 2016/040672.
"International Application Serial No. PCT US2015 049478, International Preliminary Report on Patentability dated Mar. 23, 2017", 7 pgs.
"U.S. Appl. No. 14/517,505, Advisory Action dated Feb. 5, 2018", 4 pgs.
"U.S. Appl. No. 14/517,505, Examiner Interview Summary dated Sep. 7, 2018", 3 pgs.
"U.S. Appl. No. 16/405,082, Preliminary Amendment filed Aug. 19, 2019", 8 pgs.

* cited by examiner

DETECTING CROSS-LINGUAL COMPARABLE LISTINGS

CROSS REFERENCE TO RELATED APPLICATIONS

This application is a continuation of U.S. patent application Ser. No. 16/405,082 by Hewavitharana et al., entitled "Detecting Cross-Lingual Comparable Listings," filed May 7, 2019; which is a continuation of U.S. patent application Ser. No. 15/264,873 by Hewavitharana et al., entitled "Method, Medium, and System for Detecting Cross-Lingual Comparable Listings for Machine Translation Using Image Similarity," filed Sep. 14, 2016, now U.S. Pat. No. 10,319,019 B2, issued Jun. 11, 2019; each of which is hereby incorporated herein it its entirety.

TECHNICAL FIELD

The subject matter disclosed herein generally relates to the technical field of special-purpose machines that facilitate identification of similarity of listings, including software-configured computerized variants of such special-purpose machines and improvements to such variants, and to the technologies by which such special-purpose machines become improved compared to other special-purpose machines that facilitate the pairing of similar listings.

BACKGROUND

Conventional retailer websites allow shoppers to browse through a wide variety of products available for sale online. Each retailer website typically hosts multiple product listing webpages and multiple different online portals that offer various products for sale. Each different online portal may service consumers in a particular country or region and, therefore, may be based on a particular language and have its own listings of products. The retailer website may thereby have listings for similar products in different languages posted across various different online portals.

BRIEF DESCRIPTION OF THE DRAWINGS

Various ones of the appended drawings merely illustrate example embodiments of the present disclosure and cannot be considered as limiting its scope.

Figure 1:
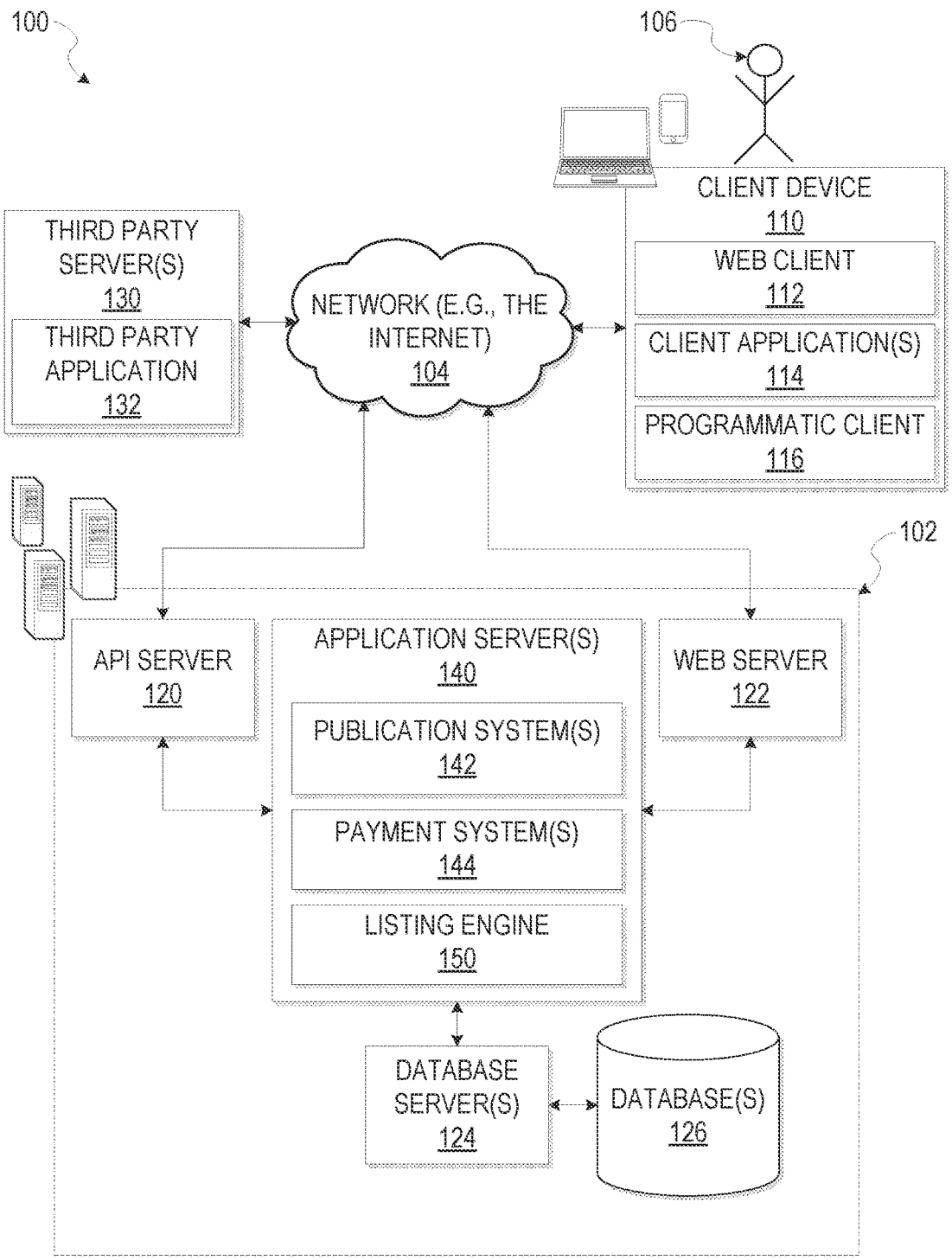
FIG. 1 is a block diagram illustrating a networked system, according to some example embodiments.

The headings provided herein are merely for convenience and do not necessarily affect the scope or meaning of the terms used.

DETAILED DESCRIPTION

The description that follows describes systems, methods, techniques, instruction sequences, and computing machine program products that are illustrative example embodiments of the present subject matter. In the following description, for the purposes of explanation, numerous specific details are set forth in order to provide an understanding of various example embodiments of the present subject matter.

In various example embodiments, a Listing Engine identifies listing pairs that each describe a physical instance of the same (or similar) item across different language portals and extracts parallel data. The Listing Engine inserts the parallel data into a training data database of a machine translation system. The machine translation system thereby utilizes the parallel data as training data to learn accurate translations between the respective languages of the parallel data. In example embodiments, one or more deep-learned neural network models are used for feature extraction based on listing images and listing text.

In various example embodiments, the Listing Engine translates a first listing from a first language to a second language. The first listing includes at least one image of a first item (such as a product or a good for purchase). The Listing Engine provides as input to an encoded neural network model a translated first listing and a second listing in the second language. The second listing includes at least one image of a second item. The first item and the second item are each a physical instance of the same (or similar) item, product or good. The Listing Engine obtains from the encoded neural network model a first feature vector for the translated first listing and a second feature vector for the second listing. The first and the second feature vectors both include at least one type of image signature feature and at least one type of listing text-based feature.

It is understood that an encoded neural network model includes encoded instructions that, when executed by one or more processors, performs data analysis according to one or more operations that simulate behaviors of a neural network. The Listing Engine includes one or more encoded neural network models, which can be stored in and accessed at one or more databases. The Listing Engine inserts portions of listings into the encoded neural network model. The encoded neural network model performs feature extraction based on the inserted portions of listing and generates output. The output generated by the encoded neural network model are a feature vector for each respective listing. It is understood that various embodiments of the Listing Engine are not limited to the encoded neural network model. Other statistical models such as support-vector machines or maximum entropy classifiers, can be used for the detecting similar listing pairs.

The Listing Engine calculates a similarity score based on the first feature vector and the second feature vector. Based on the similarity score at least meeting a similarity score threshold, the Listing Engine generates a pairing of the first listing in the first language with the second listing in the second language for inclusion in training data of a machine translation system. While conventional systems fail to consider image and text characteristics between data in different languages, the pairing of listing generated by the Listing Engine is based on a degree of likelihood that the first item and the second item respectively described by the first and second listings are the same.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some example embodiments, the client device 110 may comprise a display module (not shown) to display information (e.g., in the form of user interfaces). In further example embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one example embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In example embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some example embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments, such as a plurality of listings in various languages. Each listing may have one or more images.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative example embodiments, each system 142 and 144 may form part of a payment service that is separate and distinct from the networked system 102. In some example embodiments, the payment systems 144 may form part of the publication system 142.

The Listing Engine 150 may provide functionality operable to perform various parings of listings that are in different languages. For example, the Listing Engine 150 may access the listings from the databases 126, the third party servers 130, the publication system 120, and other sources. In some example embodiments, the Listing Engine 150 generates pairings of listings that are in different languages but describe a similar item.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and Listing Engine 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
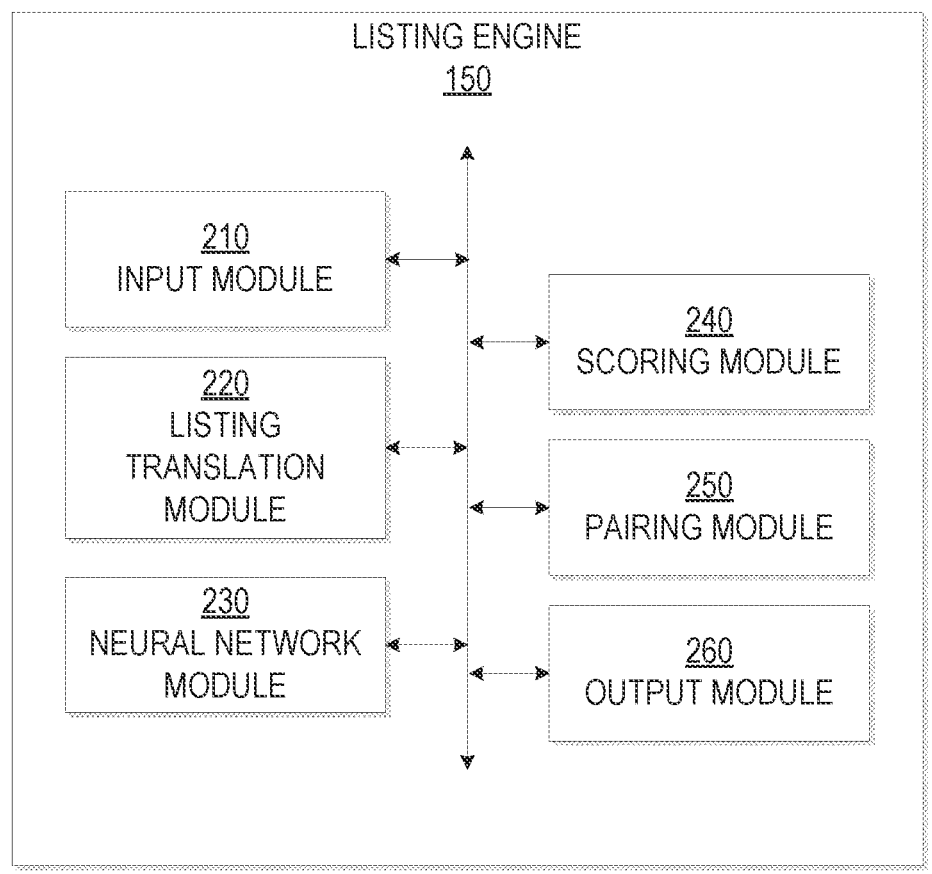
FIG. 2 is a block diagram showing example components of a Listing Engine according to an example embodiment.

FIG. 2 is a block diagram showing example components of a Listing Engine 150 according to an example embodiment. While the modules 210, 220, 230, 240, 250 and 260 are described as performing specific operations, one of ordinary skill in the art will appreciate that such modules may be configured to perform alternative and/or additional operations.

In one example embodiment, the input module 210 is a hardware-implemented module that controls, manages and stores information related to any inputs from one or more components of system 102 as illustrated in FIG. 1. In various example embodiments, the inputs include one or more listings from a plurality of listings in different languages. Each listing may have one or more images.

In one example embodiment, the listing translation module 220 is a hardware-implemented module which manages, controls, stores, and accesses information related to translating one or more listing from a first language to a second language. In various example embodiments, a first listing is translated from the first language to the second language due to a second listing being in the second language. The translated first listing and the second listing can then be compared to determine their similarity.

In one example embodiment, the neural network module 230 is a hardware-implemented module which manages, controls, stores, and accesses information related to providing input to one or more neural network models and receiving a feature(s) from the one or more neural network models. For example, the translated first listing and the second listing in the second language can be input and the neural network model(s) returns as output respective feature vectors for each input listing.

In one example embodiment, the scoring module 240 is a hardware-implemented module which manages, controls, stores, and accesses information related to calculating a similarity score based on listing feature vectors. In example embodiments, a cosine similarity between the listing feature vectors is calculated.

In one example embodiment, the pairing module 250 is a hardware-implemented module which manages, controls, stores, and accesses information related to generating a listing pair. In various example embodiments, based on a similarity score between listings meeting a threshold score, the listings are associated with each other to generate a listing pair.

In one example embodiment, the output module 260 is a hardware-implemented module that controls, manages and stores information related to which sends any outputs to one or more components of system 100 of FIG. 1 (e.g., one or more client devices 110, 112, third party server 130, etc.) or to one more components of system 102 of FIG. 1. In some example embodiments, the output is a pairing of listings where each listing in the pairing is in a different language. Each listing in the pairing describes the same (or similar) item.

Figure 3:
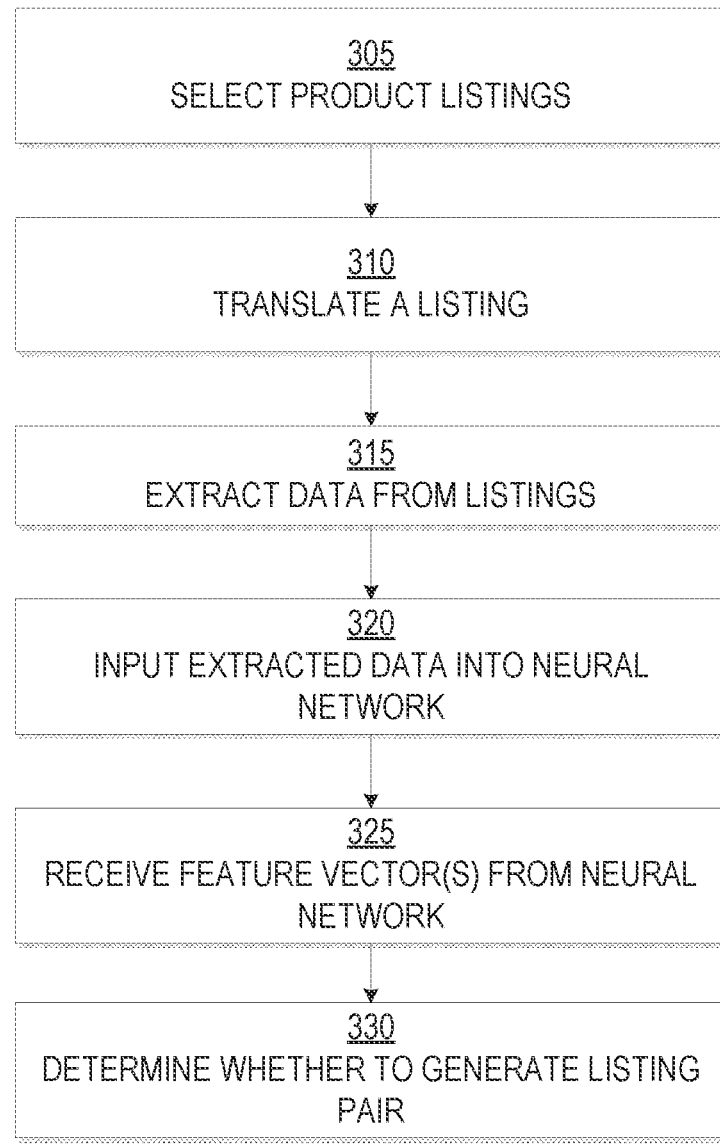
FIG. 3 is a flow diagram illustrating a method of generating a pairing of a first listing in a first language with a second listing in a second language for inclusion in training data of a machine translation system, in accordance with an example embodiment.

FIG. 3 is a flow diagram illustrating a method 300 of generating a pairing of a first listing in a first language with a second listing in a second language for inclusion in training data of a machine translation system, in accordance with an example embodiment.

At operation 305, the Listing Engine 150 selects two product listings from a plurality of product listings. A first product listing is in a first language and from a first plurality of first language listings and a second product listing is in a second language and from a second plurality of second language listing.

At operation 310, the Listing Engine 150 translates the first product listing from the first language to the second language to create a translated first product listing.

At operation 315, the Listing Engine 150 extracts data from the translated first product listing and the second product listing. For example, the Listing Engine 150 extracts one or more portions of an image of the translated first product listing and one or more portions of text from a pre-defined section(s) of the translated first product listing. A pre-defined section can be a product listing title, a product listing description section and product listing structural information such as product color, product brand, product model number and product specifications (i.e. weight, length, voltage requirement, memory size). The Listing Engine 150 also extracts one or more portions of an image of the second product listing and one or more portions of text from a pre-defined section(s) of the second product listing.

At operation 320, the Listing Engine 150 provides as input the extracted image portions and the extracted text from the translated first product listing and the second product listing into an encoded neural network model. The encoded neural network model is represented according to one or more encoded instructions and one or more data structures.

At operation 325, the Listing Engine 150 receives as output from the encoded neural network model a feature vector for the translated first product listing and a feature vector for second product listing. A feature vector received as output from the encoded neural network model includes one or more feature vector units based on characteristics of extracted image portions (such as pixel color, pixel location, shapes within the image portions, and image portion texture). The feature vector further includes one or more feature vector units based on characteristics of extracted text, such as lexical translation overlap and edit distance. Lexical translation overlap is determined by counting the number of similar (i.e. matching portions) words (according to a dictionary, for example) that appear both in the translation of the first product listing and the second product listing and normalizing for length. Other feature vector units can be based on a given listing's length (or total amount of text in number of word tokens), the given listing's title length (in number of word tokens) and text from the given listing's structural information section.

At operation 330, the Listing Engine 150 determines whether to generate a listing pair. The Listing Engine 150 calculates the cosine similarity of the feature vectors received from the encoded neural network model. The Listing Engine 150 compares the similarity score to a threshold similarity score. In response to determining the threshold similarity score is met or exceeded, the Listing Engine 150 pairs the first product listing with the second product listing and inserts the pair into training data of a machine translation system. The pair is thereby used to learn proper translations between the first language and the second language since the pair has already been identified by the Listing Engine 150 as most likely having text that relates to similar subject matter.

Figure 4:
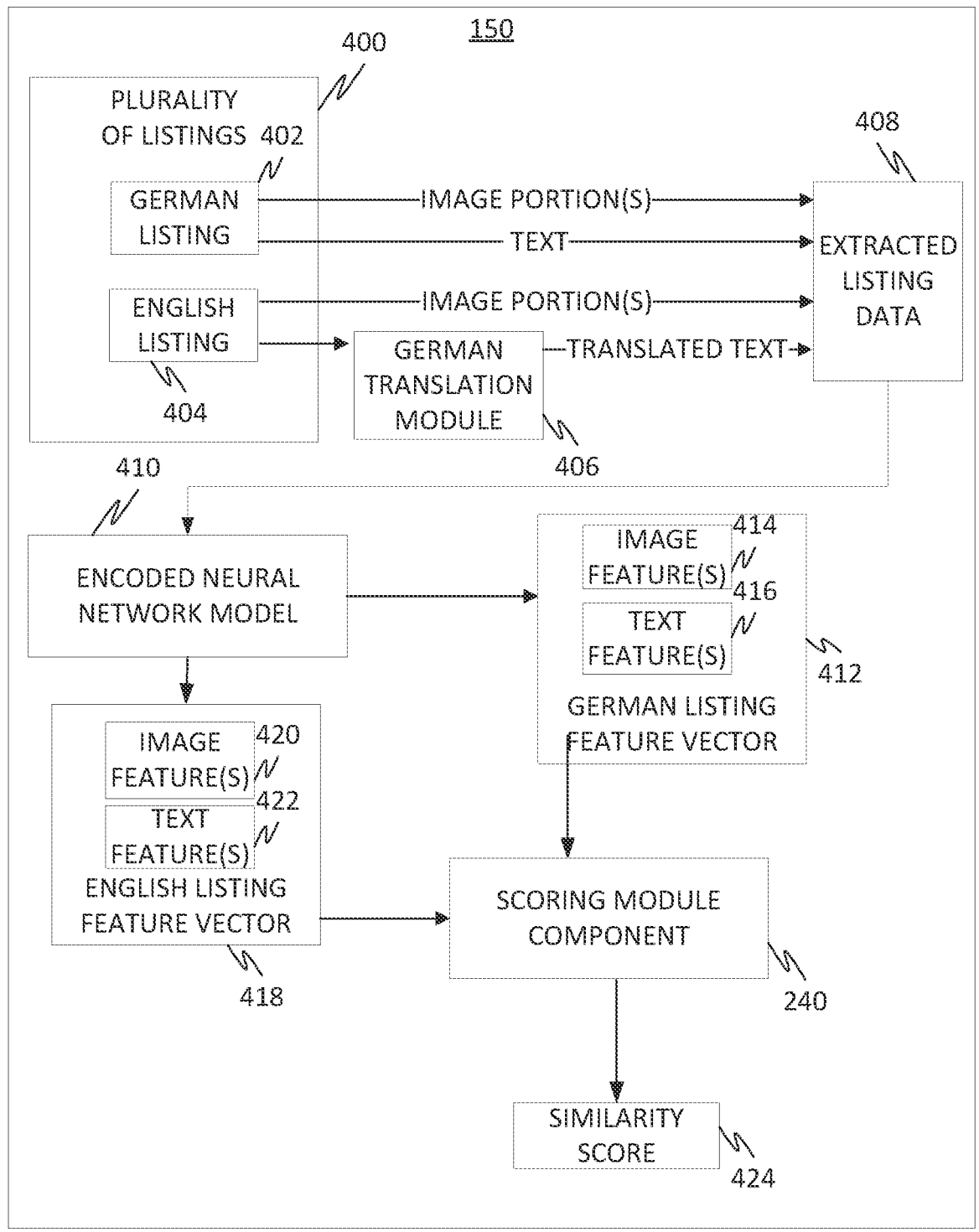
FIG. 4 is a block diagram illustrating a Listing Engine, in accordance with an example embodiment.

FIG. 4 is a block diagram illustrating a Listing Engine 150, in accordance with an example embodiment.

The Listing Engine 150 utilizes the similarity of images in multilingual listings to identify one or more comparable listing pairs, where each listing in the pair is related to a similar item. For example, in various example embodiments, a plurality of listing 400 includes a German language product listing 402 and an English language product listing 404. The German product listing 402 and the English product listing 404 may both be related to the same type of smartphone. The images (or image portions) in both the German and English product listings 402, 404 will most likely have similar image characteristics. In addition, the English words used to describe the smartphone in the English language product listing 404 are most likely similar in meaning as the German words used to describe the same type of smartphone in the German language product listing 404.

A German translation module 406 generates a German version of the English language product listing 404. The Listing Engine 150 generates extracted listing data 408. The Listing Engine 150 extracts image portions from both product listings 402, 404 and respective portions of text from the German product listing 402 and the German version of the English language product listing 404.

The Listing Engine 150 provides as input the extracted listing data 408 to an encoded neural network model 410. The encoded neural network model 410 returns a German feature vector 412 for the German product listing 402 and an English feature vector 418 based on the German version of the English language product listing 404. The German feature vector 412 includes one or more image features 414 and one or more text features 416. The English feature vector 418 includes one or more image features 420 and one or more text features 422.

An image feature 414 can be an image signature feature based on at least one pixel color of an image portion in a product listing and at least one pixel location in the product listing. A first type of text-based feature 416, 422 can be based on an edit distance between respective text portions of two listings. For example, an edit distance can be based on respective titles of two listing. A second type of text-based feature 416, 422 can be based on a length of a product listing. A third type of text-based feature 416, 422 can be based on a lexical translation overlap between two respective product listings. A fourth type of text-based feature 416, 422 can be based on a product category in structural information of a product listing. A fifth type of text-based feature 416, 422 can be based on any portion(s) of structural information of an item in a product listing, such as item color and item brand.

The Listing Engine 150 inputs the feature vectors 412, 418 into a scoring module component 240. The scoring module component 240 calculates a cosine similarity of the feature vectors 412, 418 to determine a similarity score 424 for the German and English product listings 402, 404. Upon determining the similarity score 424 meets or exceeds a threshold score, a listing pair is generated by the Listing Engine 150 to include the German and English product listings 402, 404. The Listing Engine 150 inserts the generated listing pair into a training data database of a machine translation system.

Figure 5:
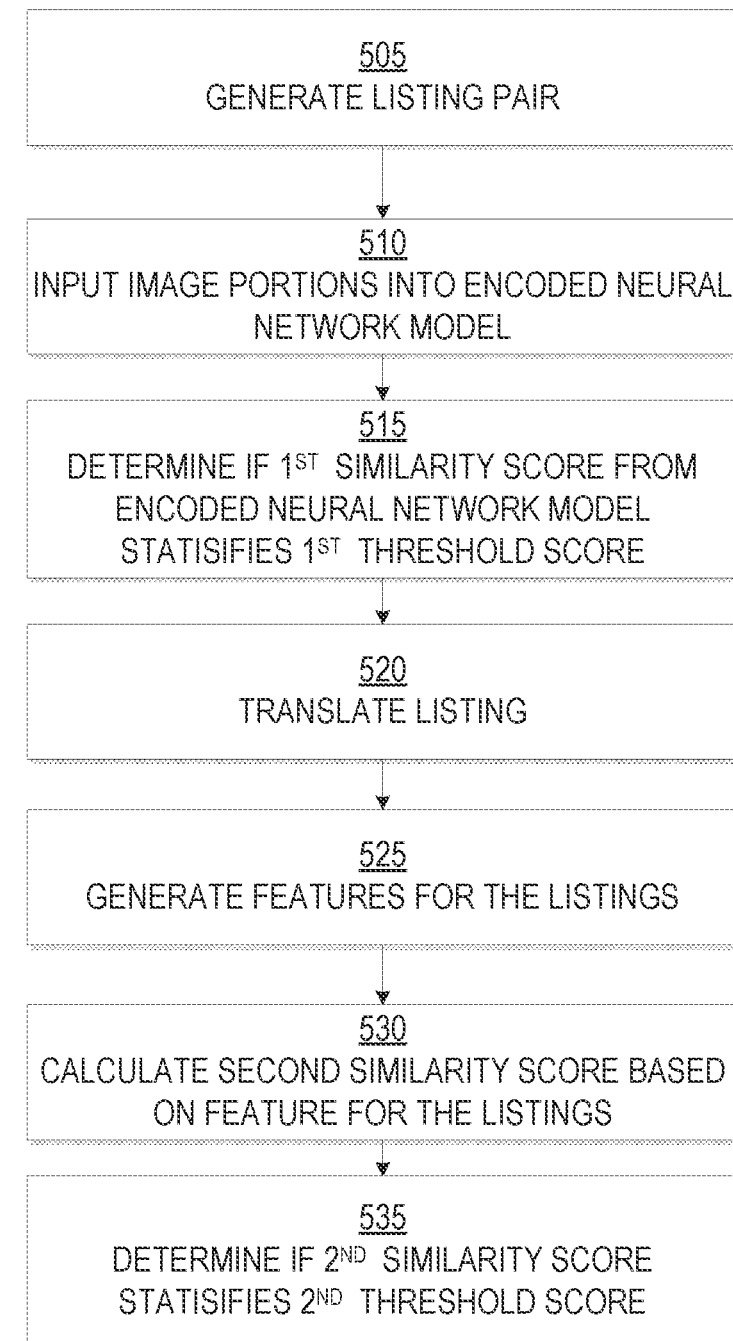
FIG. 5 is a flow diagram illustrating a method of generating a pairing of a first listing in a first language with a second listing in a second language for inclusion in training data of a machine translation system, in accordance with an example embodiment.

FIG. 5 is a flow diagram illustrating a method 500 of generating a pairing of a first listing in a first language with a second listing in a second language for inclusion in training data of a machine translation system, in accordance with an example embodiment.

At operation 505, the Listing Engine 150 generates a listing pair. For example, Listing Engine accesses a first plurality of listings in a source language and a second plurality of listings in a target language. The Listing Engine 150 generates a plurality of listing pairs by determining a Cartesian product of the first plurality of listings and the second plurality of listings. The Listing Engine 150 in a particular listing pair, a first listing in the particular listing pair is in a source language and from the first plurality of listing. A second listing in the particular listing pair is in a target language and from the second plurality of listings.

At operation 510, the Listing Engine 150 inputs image portions into an encoded neural network model. For each pairing of listings, image portions are input into a first encoded neural network model. For example, in reference to the particular listing pair, an image portion(s) from the first listing and an image portion(s) from the second listing is input into the first encoded neural network model. The first encoded neural network model returns as first output a first similarity score. The first similarity score is representative of a degree of similarity between the various input image portions of the first and second listing.

At operation 515, the Listing Engine 150 determines if the first similarity score satisfies a first threshold score. If the first threshold score is satisfied, the Listing Engine 150 executes operation 520. As such, the Listing Engine 150 performs a first similarity pass between the first and second listing so as to increase the efficiency in identifying listings pairs for training data. If the first similarity score does not satisfy the first threshold score, the Listing Engine 150 discards the particular listing pair and returns to the plurality of Cartesian product listing pairs to select a new listing pair.

At operation 520, the Listing Engine 150 generates a translation of the first listing from the source language to the target language. For example, the Listing Engine 150 can input the first listing into a machine-translation system or replace portions of source language text with portions of corresponding target language text selected from a translation dictionary stored in one or more databases.

At operation 525, the Listing Engine 150 generates one or more features based on the translated first listing in the target language and the second listing in the target language. For example, a feature can be based on at least one text portion from a listing title. A feature can also be lexical similarity scores between the portions of text from the translated first listing and the second listing. A feature can be Levenshtein distances between the respective titles of the translated first listing and the second listing.

At operation 530, the Listing Engine 150 calculates a second similarity score based on the features of the first listing and the second listing. For example, a second encoded neural network model returns as second output a second similarity score. The second similarity score is representative of a similarity between the translated first listing and the second listing in the target language. At At operation 535, based on the second similarity score being determined by the Listing Engine 150 as being equal to or more than an empirically-determined second similarity score threshold, the Listing Engine 150 tags the particular listing pair as including comparable listings. If the second similarity score is determined by below the second similarity score threshold, the Listing Engine 150 discards the particular listing pair. The Listing Engine 150 returns to the plurality of Cartesian product listing pairs to select a new listing pair.

Modules, Components, and Logic

Certain example embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5 are implemented in some example embodiments in the context of a machine and an associated software architecture. The sections below describe representative software architecture(s) and machine (e.g., hardware) architecture that are suitable for use with the disclosed example embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 6:
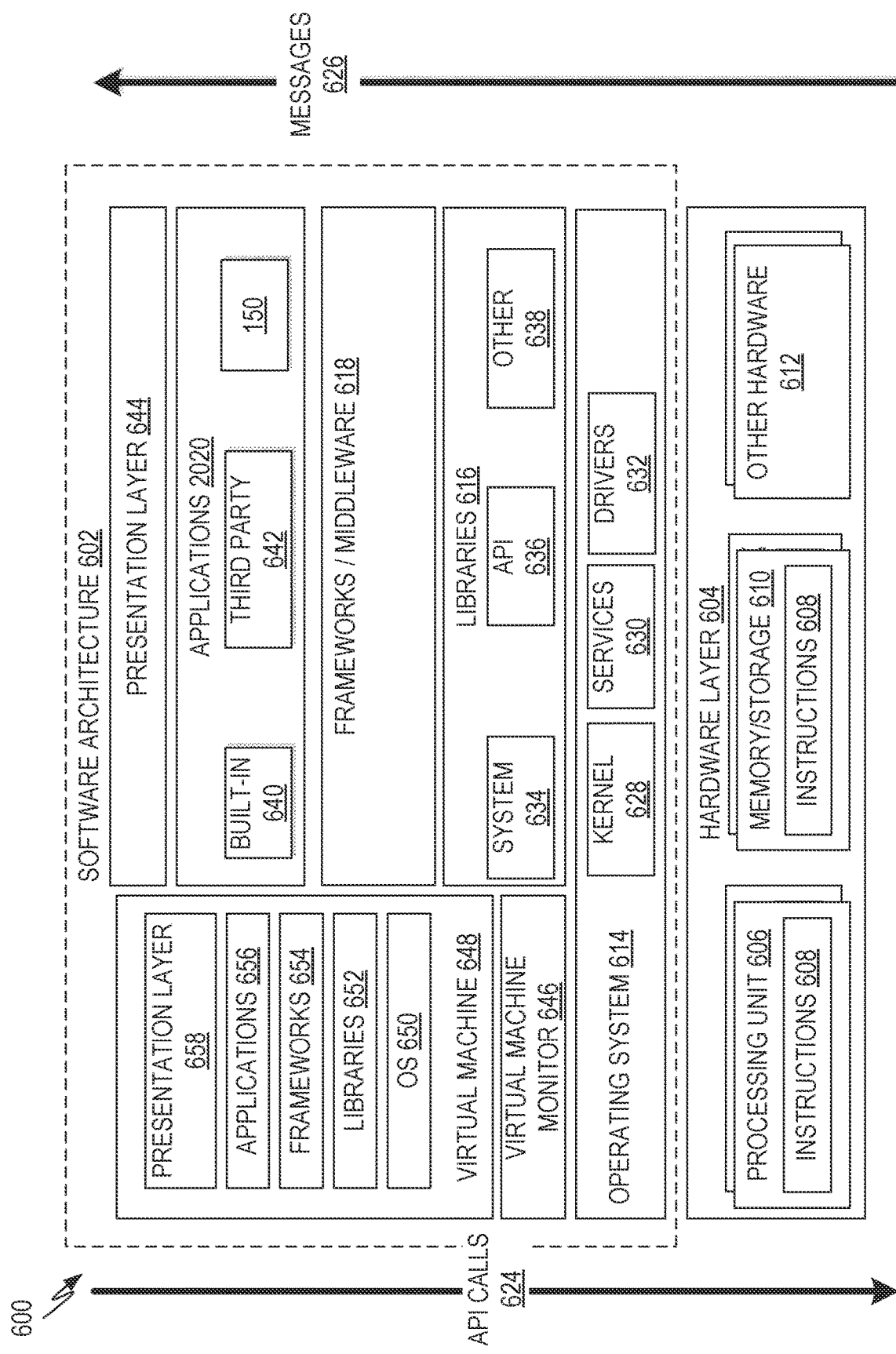
FIG. 6 is a block diagram illustrating an example of a software architecture that may be installed on a machine, according to some example embodiments.

FIG. 6 is a block diagram 600 illustrating a representative software architecture 602, which may be used in conjunction with various hardware architectures herein described. FIG. 6 is merely a non-limiting example of a software architecture and it will be appreciated that many other architectures may be implemented to facilitate the functionality described herein. The software architecture 602 may be executing on hardware such as machine 700 of FIG. 7 that includes, among other things, processors 710, memory 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 2-5. Hardware layer 604 also includes memory and/or storage modules 610, which also have executable instructions 608. Hardware layer 604 may also comprise other hardware as indicated by 612 which represents any other hardware of the hardware layer 604, such as the other hardware illustrated as part of machine 700.

In the example architecture of FIG. 6, the software 602 may be conceptualized as a stack of layers where each layer provides particular functionality. For example, the software 602 may include layers such as an operating system 614, libraries 616, frameworks/middleware 618, applications 620 and presentation layer 622. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system. Alternatively, or additionally, in some systems interactions with a user may occur through a presentation layer, such as presentation layer 644.

In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware machine (such as the machine of FIG. 7, for example). A virtual machine is hosted by a host operating system (operating system 614 in FIG. 6) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
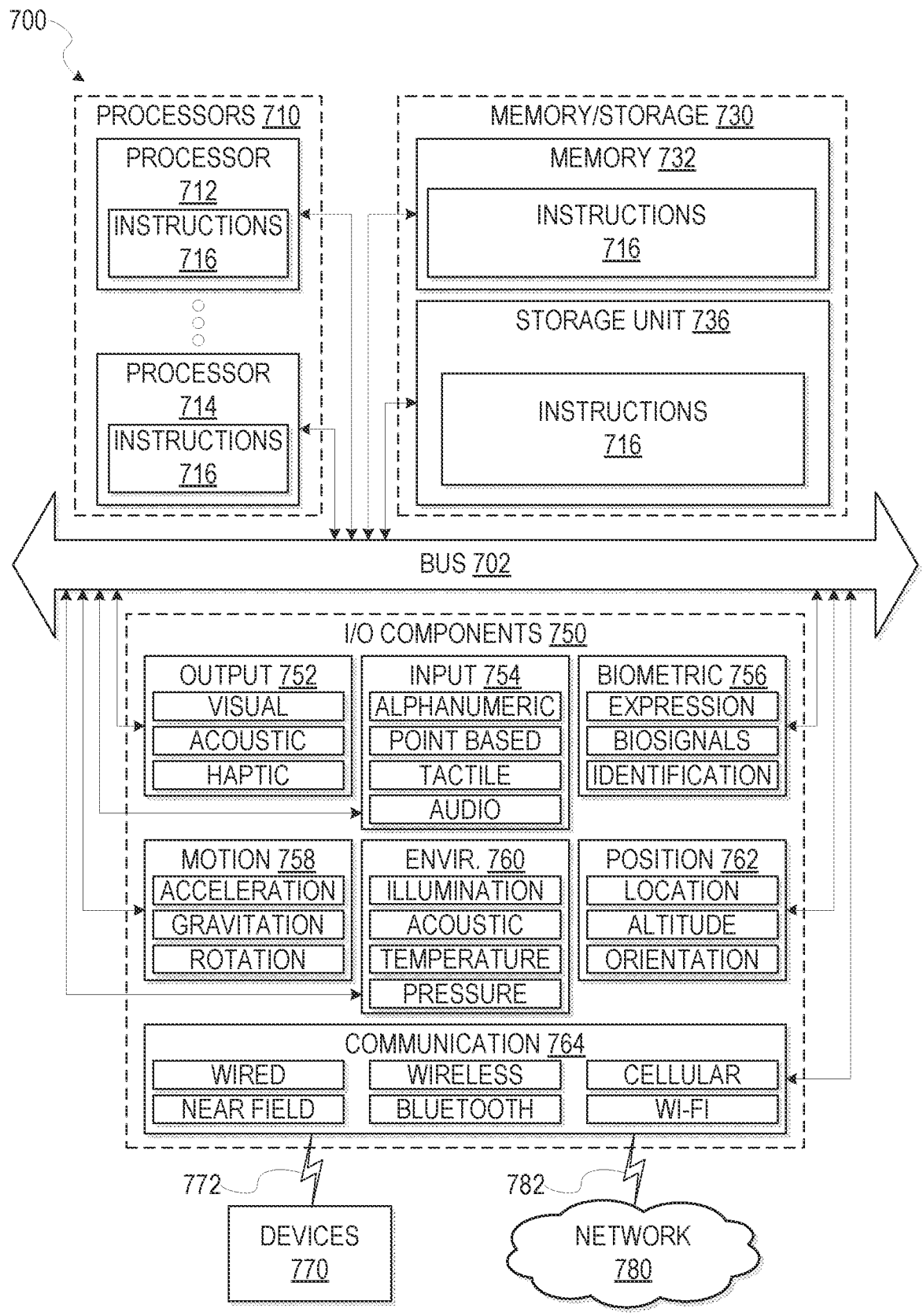
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions may cause the machine to execute the flow diagrams of FIGS. 3 and 5 Additionally, or alternatively, the instructions may implement the actions and modules of FIGS. 2 and 4, and so forth. The instructions transform the general, non-programmed machine into a particular machine programmed to carry out the described and illustrated functions in the manner described. In alternative example embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these example embodiments without departing from the broader scope of example embodiments of the present disclosure. Such example embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

What is claimed is:

1. A computer system comprising:
a hardware processor; and
a memory device storing an instruction set that, when executed by the hardware processor, causes the computer system to perform operations comprising:
selecting a first listing in a first language from a first plurality of listings in the first language and a second listing in a second language from a second plurality of listings in the second language;
providing, as input to a neural network model, a first image portion of the first listing and a second image portion of the second listing to generate a first similarity score;
translating, based on the first similarity score satisfying a first threshold, a first text portion of the first listing to the second language;
determining a second similarity score of the translated first text portion and a second text portion of the second listing; and
storing, based on the second similarity score satisfying a second threshold, an association between the first listing and the second listing in a data store.

2. The computer system of claim 1, the operations further comprising:
generating a cartesian product of the first plurality of listings and the second plurality of listings, wherein selecting the first listing and the second listing is based on the cartesian product.

3. The computer system of claim 1, the operations further comprising:
identifying a first image feature of the first image portion and a second image feature of the second image portion, wherein the first similarity score is based at least in part on the first image feature and the second image feature.

4. The computer system of claim 3, wherein the first image feature comprises at least one of a first pixel color in the first image portion or a first pixel location within the first listing, and wherein the second image feature comprises at least one of a second pixel color in the first image portion or a second pixel location within the first listing.

5. The computer system of claim 1, wherein determining the second similarity score comprises:
calculating the second similarity score using a support-vector machine or a maximum entropy classifier.

6. The computer system of claim 1, the operations further comprising:
determining an edit distance between corresponding portions of the translated first text portion and the second text portion, wherein the second similarity score is based at least in part on the edit distance.

7. The computer system of claim 1, wherein the first text portion is a first title portion of the first listing and the second text portion is a second title portion of the second listing.

8. The computer system of claim 1, the operations further comprising:
determining a lexical translation overlap between corresponding portions of the first text portion and the second text portion, wherein the second similarity score is based at least in part on the lexical translation overlap.

9. A method performed by hardware processing circuitry, comprising:
selecting a first listing in a first language from a first plurality of listings in the first language and a second listing in a second language from a second plurality of listings in the second language;
providing, as input to a neural network model, a first image portion of the first listing and a second image portion of the second listing to generate a first similarity score;
translating, based on the first similarity score satisfying a first threshold, a first text portion of the first listing to the second language;
determining a second similarity score of the translated first text portion and a second text portion of the second listing; and
storing, based on the second similarity score satisfying a second threshold, an association between the first listing and the second listing in a data store.

10. The method of claim 9, further comprising:
generating a cartesian product of the first plurality of listings and the second plurality of listings, wherein selecting the first listing and the second listing is based on the cartesian product.

11. The method of claim 9, further comprising:
identifying a first image feature of the first image portion and a second image feature of the second image portion, wherein the first similarity score is based at least in part on the first image feature and the second image feature.

12. The method of claim 11, wherein the first image feature comprises at least one of a first pixel color in the first image portion or a first pixel location within the first listing, and wherein the second image feature comprises at least one of a second pixel color in the first image portion or a second pixel location within the first listing.

13. The method of claim 9, wherein determining the second similarity score comprises:
calculating the second similarity score using a support-vector machine or a maximum entropy classifier.

14. The method of claim 9, further comprising:
determining an edit distance between corresponding portions of the translated first text portion and the second text portion, wherein the second similarity score is based at least in part on the edit distance.

15. The method of claim 9, wherein the first text portion is a first title portion of the first listing and the second text portion is a second title portion of the second listing.

16. The method of claim 9, further comprising:
determining a lexical translation overlap between corresponding portions of the first text portion and the second text portion, wherein the second similarity score is based at least in part on the lexical translation overlap.

17. A non-transitory computer readable storage medium comprising instructions that when executed configure hardware processing circuitry to cause a system to perform operations comprising:

selecting a first listing in a first language from a first plurality of listings in the first language and a second listing in a second language from a second plurality of listings in the second language;
providing, as input to a neural network model, a first image portion of the first listing and a second image portion of the second listing to generate a first similarity score;
translating, based on the first similarity score satisfying a first threshold, a first text portion of the first listing to the second language;
determining a second similarity score of the translated first text portion and a second text portion of the second listing; and
storing, based on the second similarity score satisfying a second threshold, an association between the first listing and the second listing in a data store.

18. The non-transitory computer readable storage medium of claim 17, the operations further comprising:
generating a cartesian product of the first plurality of listings and the second plurality of listings, wherein selecting the first listing and the second listing is based on the cartesian product.

19. The non-transitory computer readable storage medium of claim 17, the operations further comprising:
identifying a first image feature of the first image portion and a second image feature of the second image portion, wherein the first similarity score is based at least in part on the first image feature and the second image feature.

20. The non-transitory computer readable storage medium of claim 19, wherein the first image feature comprises at least one of a first pixel color in the first image portion or a first pixel location within the first listing, and wherein the second image feature comprises at least one of a second pixel color in the first image portion or a second pixel location within the first listing.

* * * * *